3,555,157
METHODS OF PROTECTING PLANTS
FROM FUNGI
Robert F. Lindemann, Parsippany, N.J., assignor to
Tenneco Chemicals, Inc., a corporation of Delaware
No Drawing. Filed Aug. 31, 1966, Ser. No. 576,219
Int. Cl. A61n 9/12, 9/20
U.S. Cl. 424—270                          3 Claims

ABSTRACT OF THE DISCLOSURE

Living plants are protected from attack by fungi by applying to them a fungicidal amount of a carbamate having the structural formula

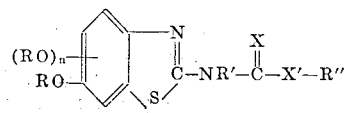

wherein R and R″ each represents an alkyl group having from 1 to 4 carbon atoms; R′ represents a member selected from the group consisting of hydrogen and alkyl groups having from 1 to 4 carbon atoms; X and X′ each represents a member selected from the group consisting of oxygen and sulfur; and $n$ represents an integer in the range of zero to one. Among the most active of these fungicidal compounds are methyl N-(6-methoxy-2-benzothiazolyl) carbamate and ethyl N-(6-methoxy-2-benzothiazolyl) thiol carbamate.

---

This invention relates to fungicidal compositions and to a method of controlling fungi. More particularly, it relates to fungicidal compositions that are suitable for use on living plant materials intended for human or animal consumption and to a method of controlling fungi on the plant materials through the use of these compositions.

In accordance with the present invention, it has been found that 6-alkoxybenzothiazole carbamates are highly effective against plant pathogens, such as *Puccinia rubigovera*, which causes leaf rust of wheat. These fungicidal compounds are stable and resistant to weathering and at the concentration levels necessary to control the plant pathogens are substantially nontoxic to the living plants and to mammals that consume the plant materials.

The compounds that can be used as the primary fungicidally-active component of the fungicidal compositions of this invention may be represented by the structural formula

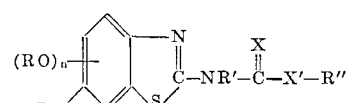

wherein R and R″ each represents an alkyl group having from 1 to 4 carbon atoms; R′ represents a member selected from the group consisting of hydrogen and alkyl groups having from 1 to 4 carbon atoms; X and X′ each represents a member selected from the group consisting of oxygen and sulfur, and $n$ represents an integer in the range of zero to one. Illustrative of these compounds are methyl N-(6-methoxy-2-benzothiazolyl) carbamate, propyl N-(6-methoxy-2-benzothiazolyl) carbamate, butyl N-(6-butoxy-2-benzothiazolyl) carbamate, methyl N-(5,6-dimethoxy-2-benzothiazolyl) carbamate, ethyl N-(6-methoxy-2-benzothiazolyl)-N-ethyl-carbamate, methyl N-(6-methoxy-2-benzothiazolyl)-thiolcarbamate, butyl N-(6-butoxy-2-benzothiazolyl) thiolcarbamate, methyl N-(5,6-dimethoxy-2-benzothiazolyl) carbamate, ethyl N-(6-ethoxy-2-benzothiazolyl)-N-ethyl-thiolcarbamate, methyl N-(6-methoxy-2-benzothiazolyl)-dithiocarbamate, ethyl (5-ethoxy-6-methoxy-2-benzothiazolyl)-N-methyl-dithiocarbamate, and the like. The preferred compounds for use as agricultural fungicides are those in which $n$ is zero, R′ is hydrogen, and X is oxygen, for example, methyl N-(6-methoxy-2-benzothiazolyl) carbamate and ethyl N-(6-methoxy-2-benzothiazolyl) thiolcarbamate.

The fungicidal compounds of this invention may be prepared by any suitable and convenient procedure. For example, the appropriate substituted benzothiazole may be reacted with an alkyl chloroformate or chlorothioformate to form the 6-alkoxybenzothiazole carbamate.

Various techniques may be employed for treating crop plants with the fungicidal compounds of this invention. For example, the parts of the plants above or in the soil or the plant seeds may be contacted with the fungicidal compound. Alternatively, the fungicide may be introduced into the soil near the roots of the plant.

While the 6-alkoxybenzothiazole carbamates of this invention may be applied as such to plants, to seeds, or to the soil, they are ordinarily and preferably combined with an inert fungicidal adjuvant carrier and applied as sprays or as dusts.

The 6-alkoxybenzothiazole carbamates are preferably applied by spraying the plants, the seeds, or the soil with an aqueous emulsion or suspension of the fungicidal compound. Aqueous compositions containing about 0.001 percent to 1 percent by weight, and preferably 0.01 percent to 0.5 percent, of the active compound are particularly suitable. These sprays generally also contain about 0.01 percent to about 0.05 percent by weight of a conventional wetting agent, such as an alkyl sulfate, an alkyl aryl sulfonate, a sulfosuccinate, a polyethylene glycol ether, and the like.

The fungicidal compounds may also be dissolved in an inert organic solvent, such as acetone, naphtha, or ethylene dichloride, and applied as a solution, or they may be mixed with or deposited upon such inert finely-divided solid carriers as calcium phosphate, chalk, bentonite, kaolin, talc, and the like, and applied as dusts.

The amount of the composition that is applied is dependent upon such factors as the plant being treated and the plant pathogen whose control is desired and is that amount which will inhibit or control the growth of the plant pathogen without causing more than slight injury to the plant.

The 6-alkoxybenzothiazole carbamate may be used as the sole active component of the fungicidal composition. If desired, however, these compositions may also contain other fungicides, such as sulfur, the metal dimethyldithiocarbamates, and the metal ethylene bis(dithiocarbamates); insecticides, such as DDT, chlordane, and benzene hexachloride; or plant nutrients, such as urea, ammonium nitrate, and potash.

The invention is further illustrated by the examples that follow.

EXAMPLE 1

To a solution of 30 grams of 2-amino-6-methoxybenzothiazole in 200 ml. of pyridine at 10° C. was added dropwise, over a period of 30 minutes, 18 grams of methyl chloroformate. The mixture was stirred at 15° C. for 30 minutes and then poured into 600 ml. of ice water. It was stirred for an additional 30 minutes and then filtered. The product was washed with cold water and dried. There was obtained 35 grams of methyl N-(6-methoxy-2-benzothiazolyl) carbamate, which melted at 265–68° C. (literature, 271°–72° C.).

EXAMPLE 2

To a solution of 40 grams of 2-amino-6-methoxybenzothiazole in 200 ml. of pyridine at 15° C. was added 31 grams of ethyl chlorothiolformate. During the addition which took 45 minutes the temperature of the reaction mixture was held below 25° C. The reaction mixture was stirred at 25° C. for 2 hours, poured into 1000 ml. of cold water, and filtered. The produce was reslurried with 1000 ml. of water and stirred for four hours during which time the pH of the slurry was maintained above 8 by the addition of small amounts of 20 percent sodium hydroxide solution. The slurry was filtered. The product was washed with water and dried. There was obtained 37 grams of ethyl N-(6-methoxy-2-benzothiazolyl)thiol carbamate, which melted at 265°–70° C. and which contained 23.85% S and 10.06% N (calculated for $C_{11}H_{12}N_2O_2S_2$, 23.88% S and 10.44% N).

EXAMPLE 3

Samples (100 mg.) of the products of Examples 1 and 2 were dissolved in 10 ml. portions of acetone that contained 2000 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form solutions that contained 1000 p.p.m. of the 6-methoxybenzothiazole carbamates. Distilled water was added to those solutions to reduce to 10 p.p.m. the concentration of the fungicides.

EXAMPLE 4

Cheyenne wheat plants that were 6–8 inches tall were sprayed with the solutions whose preparation was described in Example 3 until the liquid dripped from the plants. When the plants had dried, they were sprayed with a suspension of spores of wheat leaf rust disease *Puccinia rubigo-vera*. For comparative purposes, methyl N-(6-chloro-2-benzothiazolyl) carbamate, which is known to have fungicidal properties, was also included in the test. Ten days after treatment the degree of suppression of the disease was noted. The following results were obtained:

| Example No.: | Fungicide | Percent control of wheat leaf rust | Phytotoxicity |
|---|---|---|---|
| A | Methyl N-(6-methoxy-2-benzothiazolyl) carbamate | 92 | Slight. |
| B | Ethyl N-(6-methoxy-2-benzothiazolyl) thiol carbamate | 86 | Do. |
| C | Methyl N-(6-chloro-2-benzothiazolyl) carbamate (comparative fungicide). | 0 | None. |

I claim:

1. The method of protecting wheat plants from attack by the wheat leaf rust fungus *Puccinia rubigo-vera* which comprises applying to the plants a fungicidal amount of a carbamate selected from the group consisting of methyl N-(6-methoxy-2-benzothiazolyl)carbamate and ethyl N-(6-methoxy-2-benzothiazolyl)thiol carbamate.

2. The method of claim 1 wherein the carbamate is methyl N-(6-methoxy-2-benzothiazolyl)carbamate.

3. The method of claim 1 wherein the carbamate is ethyl N-(6-methoxy-2-benzothiazolyl)thiol carbamate.

References Cited

UNITED STATES PATENTS

| | | | |
|---|---|---|---|
| 2,419,294 | 4/1947 | Skaptason | 167—33 |
| 2,833,689 | 5/1958 | Gerjovich | 167—33 |
| 3,242,045 | 3/1966 | Scheinpflug, et al. | 167—33 |
| 3,330,821 | 7/1967 | Harman, et al. | 260—239 |

OTHER REFERENCES

Chemical Abstracts, vol. 44, col. 1978–1979 (1950).

JEROME D. GOLDBERG, Primary Examiner